Oct. 18, 1938.   W. B. WELLS   2,133,604
METHOD OF MANUFACTURING KNIFE EDGE MEMBERS FOR KNIFE EDGE BEARINGS
Original Filed Oct. 16, 1934

INVENTOR
Wesley B. Wells.
BY
HIS   ATTORNEY

Patented Oct. 18, 1938

2,133,604

UNITED STATES PATENT OFFICE 2,133,604

METHOD OF MANUFACTURING KNIFE-EDGE MEMBERS FOR KNIFE-EDGE BEARINGS

Wesley B. Wells, Wilkinsburg, Pa., assignor to The Union Switch & Signal Company, Swissvale, Pa., a corporation of Pennsylvania Original application October 16, 1934, Serial No. 748,506, now Patent No. 2,069,908, dated February 9, 1937. Divided and this application August 15, 1936, Serial No. 96,277

3 Claims. (Cl. 29—149.5)

My invention relates to a method of manufacturing knife-edge members for knife-edge bearings.

Knife-edge bearings embodying my invention are particularly suitable for, although in no way limited to, use in bearings of the type described and claimed in my copending application for Letters Patent of the United States, Serial No. 748,506, filed on October 16, 1934, Patent No. 2,069,908, dated February 9, 1937, for Bearings and method of manufacturing the same of which copending application the present application is a division.

Figure 1:
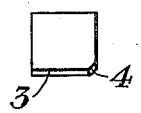
Figure 2:
Figure 3:
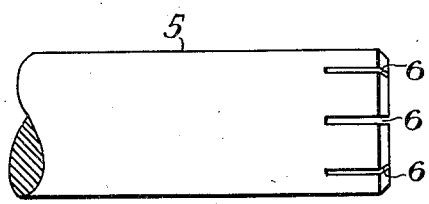
Figure 4:
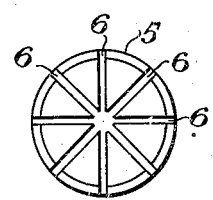

In the accompanying drawing, Figs. 1 and 2 are side elevational and end views, respectively, of a knife-edge member embodying my invention. Fig. 3 is a side view of a rod from which the knife-edge members are manufactured, showing the rod as it appears during one step in the process of manufacture of the knife-edge members. Fig. 4 is an end view of the rod shown in Fig. 3.

Similar reference characters refer to similar parts in each of the several views.

A finished knife-edge member constructed in accordance with my invention is sector shaped in cross section, as shown in Figs. 1 and 2, and has two flat radially extending sides 1 and 2, a convex side 3, and a chamfered end 4.

In manufacturing knife-edge members of this type, I employ a circular steel rod 5, as shown in Fig. 3. One end of this rod is first chamfered in the manner shown, and four radial saw cuts 6, spaced 45° apart are then made in the rod in the manner shown in Fig. 4, to a depth which is just a little greater than the desired length of the knife-edge members, thus forming at the end of the rod eight longitudinally extending sections, each of which is sector shaped in cross section. These eight sections are then cut off, thus producing eight roughed-out knife-edge members. These knife-edge members are next hardened, after which they are ground all over. It will be seen that when the knife-edge members are made in this manner, a very accurate and true knife-edge member can be obtained from rolled stock of standard size and shape without the necessity for using rolled stock of special size and shape, thus permitting the knife-edge members to be manufactured at a relatively low cost.

Although I have herein shown and described only one method for manufacturing knife-edge members for knife-edge bearings embodying my invention, it is understood that various changes and modifications may be made therein within the scope of the appended claims without departing from the spirit and scope of my invention.

Having thus described my invention, what I claim is:

1. The method of constructing knife-edge members for knife-edge bearings which consists in making a plurality of angularly spaced radial cuts into the end face of a solid rod of bearing-member stock, severing the resulting longitudinally extending sections of said stock from the remaining solid portion of the rod, and converting the severed segmental sections into finished knife-edge-bearing members.

2. The method of constructing knife-edge members for knife-edge bearings which consists in making into the end face of a solid rod of bearing-member stock a plurality of angularly spaced radial cuts which intersect one another at the axis of the rod and which axially extend therein to a depth which is slightly greater than the desired length of the knife-edge members, severing the resulting longitudinally extending sections of said stock from the remaining solid portion of the rod by means of a perpendicular cut through the divided portion thereof, and hardening and grinding said segmental sections to convert them into finished knife-edge members.

3. The method of constructing knife-edge members for knife-edge bearings which consists in chamfering the end of a solid rod of bearing-member stock, making into the face of said rod end a plurality of angularly spaced radial cuts which intersect one another at the axis of the rod and which axially extend therein to a depth which is slightly greater than the desired length of the knife-edge members, cutting the resulting longitudinally extending sections of said stock from the remaining solid portion of the rod, and hardening and grinding the severed segmental sections to convert them into finished knife-edge-bearing members.

WESLEY B. WELLS.